Dec. 5, 1944. J. E. SOCKE 2,364,105
HANDLE
Filed July 25, 1942
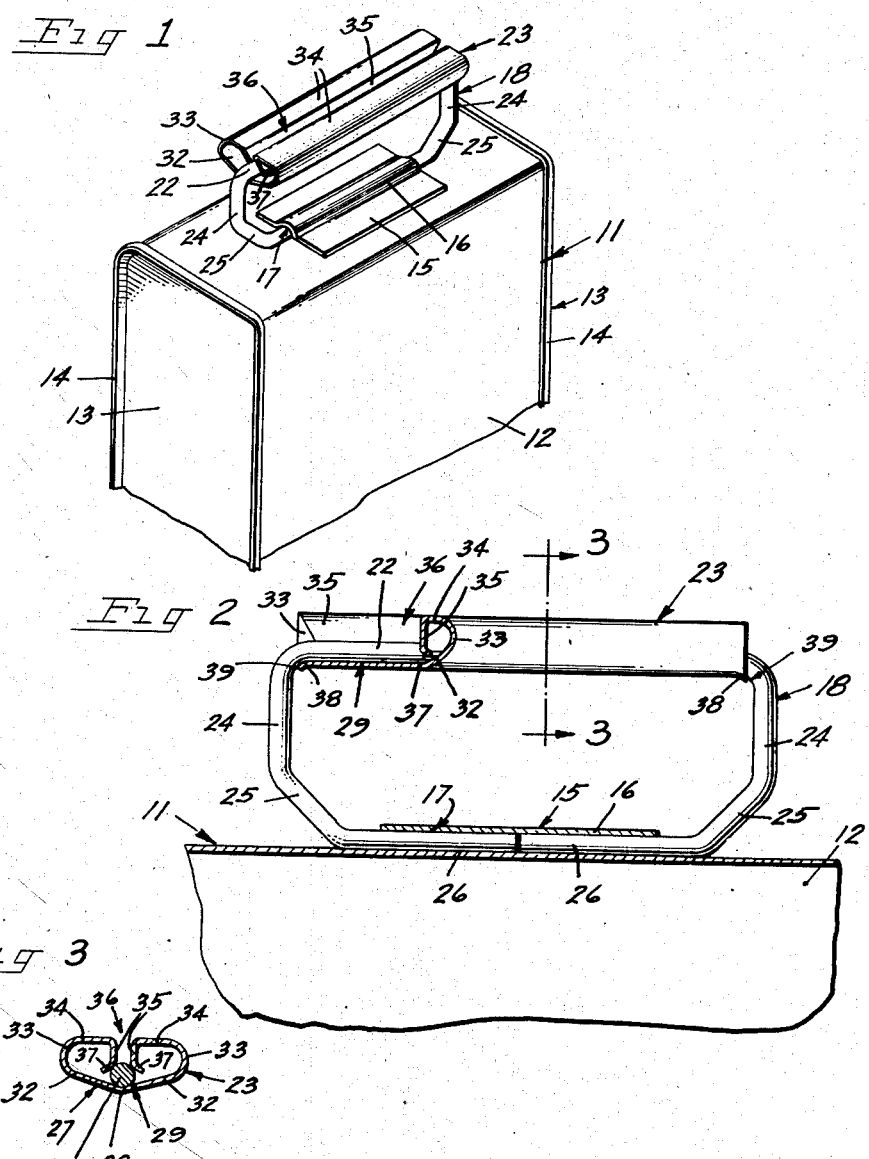
INVENTOR
John E. Socke
BY
ATTORNEYS Patented Dec. 5, 1944

2,364,105

UNITED STATES PATENT OFFICE 2,364,105

HANDLE

John E. Socke, Pelham Manor, N. Y., assignor to American Can Company, New York, N. Y., a corporation of New Jersey Application July 25, 1942, Serial No. 452,373

2 Claims. (Cl. 220—94)

This invention relates to handles for containers and has particular reference to tubular sheet metal guards or finger protectors for bails of containers which are intended for carrying heavy materials.

An object of the invention is the provision of an easily detachable hand guard or protector which is adapted to be snapped onto a bail or wire handle secured to a container for carrying it and for protecting the hand of the carrier when the container is filled with heavy materials.

Another object of the invention is the provision of a smooth and relatively inexpensive guard or hand grip made of light gauge sheet metal which will distribute the weight directed onto the bail effectively as when lifting and carrying heavily filled containers.

Another object of the invention is the provision of a tubular hand guard having inturned walls terminating in diverging flanges which are adapted to clamp or snap onto a substantially straight longitudinal section of a wire handle or bail, convergent forces being effective from three directions when the guard is brought into clamped engagement with the bail.

Numerous other objects and advantages of the invention will be apparent as it is better understood from the following description, which, taken in connection with the accompanying drawing, discloses a preferred embodiment thereof.

Referring to the drawing:

Figure 1 is a perspective view of an upper part of a container having a wire bail and a hand guard embodying the present invention;

Fig. 2 is an enlarged side view of the container and parts shown in Fig. 1 with portions thereof broken away and parts shown in section; and Fig. 3 is a sectional detail of the wire bail and hand guard as viewed substantially along the lines 3—3 in Fig. 2.

Referring now, in more detail to the preferred embodiment of the invention herein illustrated, Figs. 1 and 2 of the drawing illustrates the upper portion of a sheet metal container or can 11. Such a container comprises a can body 12 having metal ends 13 secured thereto as by end seams 14.

The upper wall of the can has a bail clip 15 secured thereto, which is substantially rectangular in outline. This bail clip is formed with a bead 16 which extends longitudinally of the clip, setting off a recess 17 on its underside for the reception of a wire bail or handle 18. The wire is engaged lightly between the walls of the recess and the container body to provide a loosely hinged connection so that the bail handle 18 is free to swing to either side of a carrying position (Fig. 1) when not in use or when the can is being tilted.

The bail handle 18 is an oblong ring which is substantially rectangular in contour and is made from round wire stock. It has a major longitudinal straight section 22 adapted to receive the hand guard or protector 23 of the present invention. Lateral sections 24 of the bail merge into angularly bent sections 25 which terminate in longitudinally aligned end sections 26. The terminal ends of the wire are disposed in the recess 17 of the bail clip and thus the bail is pivotally secured onto the container wall.

The hand guard 23 preferably is made of light gauge sheet metal and may be similar to that material from which the can body is made. The guard has an underside portion 27 (Fig. 3) which is curved at a mid-region 28 thereby forming a shallow pocket 29 at the mid-region. Angularly disposed sections 32 extend outwardly and upwardly from the midregion and thus form the hand protecting part of the guard. Each of the angular sections merge into curved or semi-circular edge sections 33. These edge sections merge into flat inwardly extended top wall portions 34 which thus give the hand guard a substantially oval or elliptical contour in cross-section.

The inner edges of the top wall portions 34 are turned inwardly of the guard and form a pair of yieldable, spaced and laterally bent walls 35 which set off a channel 36 between them. These walls 35 are substantially flat and parallel and extend the full length of the guard from end to end. Within the guard the inturned walls 35 terminate in diverging flanges 37, which are disposed adjacent the pocket 29 at the mid-region of the bottom portion 27 of the guard. Such flanges reenforce the lower edge of the walls 35 and are used primarily for holding the hand guard in place when the latter is applied to the bail.

In applying the hand guard 23 to the bail of a container it is merely necessary to place the guard against the bail with the straight section 22 of the bail at the entrance to the channel 36 of the guard and then press the guard gently against the bail. This action springs the yieldable walls 35 of the guard apart sufficiently to permit passage of the bail through the channel between the walls thereof. At the bottom of the channel the bail snaps into engagement against the wall section 27 of the guard, the bail now being fully within the pocket 29.

Referring now to Fig. 3 of the drawing, it will be observed that the flanges 37 of the guard walls 35 snap over the inserted bail and cooperate with the curved mid-region 28 in a three-line contact clamping action which securely holds the straight longitudinal section 22 of the bail in the pocket of the grip at its mid-region 28. The resilient walls 35 hold the diverging flanges 37 in this position against the bail and thus prevent accidental displacement of the guard.

At each end of the hand guard 23 a notch 38 (Fig. 2) is provided. Such a notch preferably is located in line with the mid-region 28 so that when the hand guard is positioned on the bail for carrying, as shown in the drawing, the end walls of the notches are against the curved parts of the bail as at 39. When in this position there is resistance to turning of the hand guard on the bail due to the combined friction between the bail and the guard in the region of the notches just described and the three-line contact clamping action of the flanges 37 and the curved wall part 28 against the bail.

The bail 18 with the hand guard 23 assembled thereon, is free to oscillate or rotate in its hinged connection with the container and also in the shallow pocket 29 of the guard connection as the container is being carried or tilted. The broad, smooth under side flat wall portion of the hand guard protects the hand of the carrier against chafing and cutting incident to such oscillation of the bail and is particularly convenient when the cans to which they are applied are heavily loaded. Furthermore, the hand guard can be turned over easily when the bail is swung into non-carrying position against the wall of the can. In such a position the major axis of the elliptical guard then is parallel to the can wall and the guard sections 34 rest directly on the can. The guard thus occupies less space during shipment and storage. It will be evident that the guard may also be entirely removed, if desired, and used repeatedly as a removable handle for other cans.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a bail handle for containers, the combination of a tubular snap-on hand guard formed from sheet material, a bail secured to the container, said hand guard being formed with a longitudinal pocket for the reception of a section of said bail, said hand guard also having extended curved sections merging inwardly into spaced parallel walls, each of said parallel walls terminating in a diverging flange, said flanges cooperating with said pocket to clamp said bail yieldingly therebetween.

2. In a bail handle for containers, the combination of a three-line contact clamped-on hand guard and a wire bail having a straight longitudinal section, said hand guard comprising a tubular member open along one side substantially elliptical in cross section and having a mid-portion forming a bail receiving pocket, a center part of said member opposite the opening providing a longitudinal contacting seat for the straight section of the bail, the edges of said member adjacent the open side extending inwardly with their respective ends yieldingly diverging and contacting spaced peripheral portions of the bail along spaced longitudinal lines when the bail is seated in said pocket, whereby the bail is clamped in said pocket.

JOHN E. SOCKE.